United States Patent
Yamamoto et al.

(10) Patent No.: US 11,878,412 B2
(45) Date of Patent: Jan. 23, 2024

(54) ROBOT JOINT STRUCTURE

(71) Applicant: SUMITOMO HEAVY INDUSTRIES, LTD., Tokyo (JP)

(72) Inventors: Akira Yamamoto, Yokosuka (JP); Masahiro Watanabe, Yokosuka (JP); Mitsuhiro Tamura, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/150,160

(22) Filed: Jan. 4, 2023

(65) Prior Publication Data
US 2023/0219243 A1    Jul. 13, 2023

(30) Foreign Application Priority Data
Jan. 12, 2022    (JP) .................. 2022-002974

(51) Int. Cl.
  *F16H 49/00*    (2006.01)
  *B25J 17/00*    (2006.01)
  *B25J 9/00*    (2006.01)
  *B25J 9/10*    (2006.01)

(52) U.S. Cl.
  CPC ............. *B25J 17/00* (2013.01); *B25J 9/0009* (2013.01); *B25J 9/102* (2013.01); *B25J 9/108* (2013.01)

(58) Field of Classification Search
  CPC .. B25J 9/1025; F16H 49/001; F16H 2049/003
  See application file for complete search history.

(56) References Cited

U.S. PATENT DOCUMENTS

2020/0313498 A1* 10/2020 Tucker ................. H02K 7/116
2021/0053235 A1    2/2021 Matsuo et al.

FOREIGN PATENT DOCUMENTS

JP    2019181623 A    10/2019
JP    2021076191 A    5/2021

\* cited by examiner

*Primary Examiner* — Randell J Krug
(74) *Attorney, Agent, or Firm* — HEA LAW PLLC

(57) ABSTRACT

A robot joint structure includes a first robot member, a second robot member, and a speed reducer incorporated in a joint portion that connects the first robot member and the second robot member to each other. The speed reducer includes an external gear, an internal gear that meshes with the external gear, and a fixing member that is provided so as to be non-rotatable relative to the internal gear and is fixed to the first robot member. The fixing member is fixed to the first robot member by bringing an inner peripheral surface of the first robot member and an outer peripheral surface of the fixing member into pressure contact with each other by fastening using a first fastening member. At least a part of an axial range of the first fastening member does not overlap internal teeth of the internal gear when viewed in a radial direction.

10 Claims, 6 Drawing Sheets

US 11,878,412 B2

ROBOT JOINT STRUCTURE

RELATED APPLICATIONS

The content of Japanese Patent Application No. 2022-002974, on the basis of which priority benefits are claimed in an accompanying application data sheet, is in its entirety incorporated herein by reference.

BACKGROUND

Technical Field

Certain embodiments of the present disclosure relate to a robot joint structure.

Description of Related Art

The related art discloses a joint structure including a first robot member, a second robot member, and a speed reducer incorporated in a joint portion that connects the first robot member and the second robot member.

SUMMARY

According to an embodiment of the present invention, there is provided a robot joint structure including a first robot member; a second robot member; and a speed reducer incorporated in a joint portion that connects the first robot member and the second robot member to each other. The speed reducer includes an external gear, an internal gear that meshes with the external gear, and a fixing member that is provided so as to be non-rotatable relative to the internal gear and is fixed to the first robot member. The fixing member is fixed to the first robot member by bringing an inner peripheral surface of the first robot member and an outer peripheral surface of the fixing member into pressure contact with each other by fastening using the first fastening member. At least a part of an axial range of the first fastening member does not overlap internal teeth of the internal gear when viewed in a radial direction.

According to the present disclosure, it is possible to suppress an adverse effect on meshing between the internal gear and the external gear.

DETAILED DESCRIPTION

Figure 1:
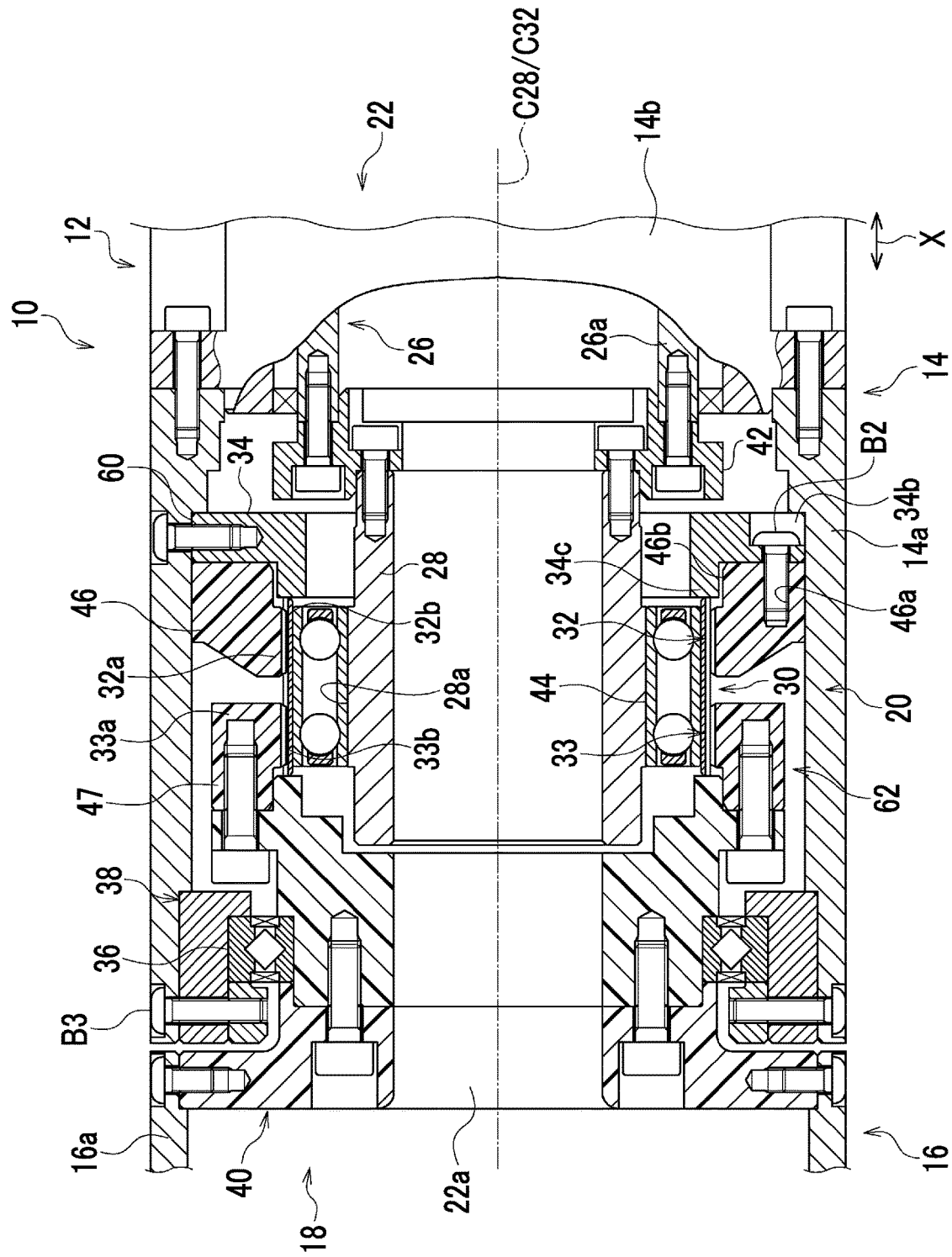
FIG. 1 is aside sectional view showing a joint structure of one embodiment.

As customers need, there are various requests regarding a fixing mode in which a speed reducer is fixed to the first robot member. As an example of this, there is a fixing mode in which a part of the speed reducer and the first robot member are brought into pressure contact with each other in the radial direction. In a case where this is adopted, a radial load that may adversely affect the meshing between an internal gear and an external gear acts on the speed reducer. A technique devised in relation to the above circumstance has not yet been proposed.

It is desirable to provide a technique capable of suppressing an adverse effect on meshing between an internal gear and an external gear when a part of a speed reducer and a first robot member are brought into pressure contact in a radial direction.

Embodiments will be described below. The same reference numerals will be given to the same components, and overlapping descriptions will be omitted. In the respective drawings, for convenience of explanation, components are appropriately omitted, enlarged, or reduced. The drawings should be viewed in accordance with the orientation of the reference numerals.

First Embodiment

FIG. 1 will be referred to. A robot 12 in which a joint structure 10 of the present embodiment is used is an articulated robot, and is used as an industrial robot, a service robot (for example, a cooking robot, a domestic robot, a medical robot, or the like). Although not illustrated, the robot 12 includes a base, and a plurality of arms supported by the base and connected in series.

The robot joint structure 10 includes a first robot member 14 and a second robot member 16, and an actuator 22 including a speed reducer 20 incorporated in a joint portion 18 that connects the first robot member 14 and the second robot member 16 to each other. The first robot member 14 and the second robot member 16 are either arms or bases of the robot 12. Here, an example in which both the first robot member 14 and the second robot member 16 serve as arms is shown, but one of the members may serve as a base. The first robot member 14 of the present embodiment serves as a support member that supports the actuator 22, and the second robot member 16 serves as a driven member driven by the actuator 22.

The first robot member 14 of the present embodiment includes a tubular first casing 14a that accommodates the speed reducer 20, and a second casing 14b that accommodates a driving device 26. The first casing 14a and the second casing 14b of the present embodiment are separate members and are fixed to each other by using bolts or the like. The second robot member 16 includes a tubular third casing 16a provided on an extension of the first casing 14a in an axial direction X.

In addition to the speed reducer 20, the actuator 22 includes a driving device 26 that inputs rotational power to the speed reducer 20. Although the driving device 26 of the present embodiment is a motor, a specific example thereof is not particularly limited and may be a gear motor, an engine, or the like. The actuator 22 is formed with a hollow portion 22a that penetrates the actuator 22 in the axial direction X (described below). A wiring member such as a cable used for the robot 12 is inserted through the hollow portion 22a.

The speed reducer 20 includes an input shaft 28 to which rotational power is input from the driving device 26, an external gear 30 driven by the input shaft 28, and a plurality of internal gears 32 and 33 that mesh with the external gear 30. In addition to this, the speed reducer 20 includes a fixing member 34 that is provided so as to be non-rotatable relative to the internal gear 32 and fixed to the first robot member 14, a main bearing 36 that connects (supports) the first robot member 14 and the second robot member 16 so as to be rotatable relative to each other, a bearing housing 38 that accommodates the main bearing 36, and a synchronization member 40 that is fixed to the second robot member 16 and is synchronizable with an axial rotation component of the external gear 30. Descriptions relating to the fixing member 34, the main bearing 36, the bearing housing 38, and the synchronization member 40 will be given below, and the surrounding structure will be described first.

In the present specification, a direction along a center C32 of the internal gear 32 is referred to as the axial direction X, and a radial direction and a circumferential direction having the center C32 as the center of a circle are also simply referred to as a radial direction and a circumferential direction. Additionally, for convenience of description, one side (right side in FIG. 1) in the axial direction X is referred to as an input side, and the other side in the axial direction X is referred to as a counter-input side.

The external gear 30 and the internal gears 32 and 33 constitute a gear mechanism that outputs the output rotation decelerated with respect to the rotation of the input shaft 28. The gear mechanism can rotate one of the external gear 30 and the internal gears 32 and 33 by driving the external gear 30 via the input shaft 28. The speed reducer 20 of the present embodiment is a bending meshing type speed reducer in which the external gear 30 serves as a flexible gear. Additionally, the speed reducer 20 of the present embodiment is a tubular bending meshing type speed reducer having a first internal gear 32 and a second internal gear 33 as the internal gears 32 and 33. The first internal gear 32 is relatively non-rotatably connected to the first robot member 14 via the fixing member 34. The second internal gear 33 is relatively non-rotatably connected to the second robot member 16 via the synchronization member 40. In the present embodiment, the first internal gear 32 is a stationary-side internal gear that is fixed to a support member (first robot member 14) so as not to rotate. Additionally, the second internal gear 33 is a drive-side internal gear that drives a driven member (second robot member 16) by outputting the output rotation.

The input shaft 28 is provided so as to be capable of transmitting rotational power from an output shaft 26a of the driving device 26. In order to realize this, the input shaft 28 of the present embodiment is integrally rotatably connected to the output shaft 26a by using a connection member 42. The input shaft 28 includes a gear drive unit 28a that drives the external gear 30 by rotating around a rotation center line C28 thereof. The gear drive unit 28a of the input shaft 28 used in the bending meshing type speed reducer 20 is a wave generator that is driven by flexibly deforming the external gear 30. The gear drive unit 28a serving as the wave generator has an elliptical shape in a cross section perpendicular to the axial direction X. The term "ellipse" herein is not limited to a geometrically exact ellipse but also includes a substantial ellipse.

The external gear 30 serving as the flexible gear is a tubular member having flexibility that can be flexibly deformed by the rotation of the gear drive unit 28a of the input shaft 28. The external gear 30 is relatively rotatably supported by the input shaft 28 via a gear bearing 44 disposed between the external gear 30 and the gear drive unit 28a of the input shaft 28. Although the gear bearing 44 of the present embodiment is a double-row bearing, the type thereof is not particularly limited and may be, for example, a single-row bearing such as a roller bearing, a needle bearing, or a ball bearing.

Unlike the external gear 30 serving as the flexible gear, the internal gears 32 and 33 of the present embodiment have a stiffness such that the internal gears 32 and 33 are not deformed following the rotation of the input shaft 28. The first internal gear 32 is provided on an inner peripheral portion of a first internal tooth member 46 as a part of the first internal tooth member 46. The first internal tooth member 46 is integrally formed of the same material as the first internal gear 32. The first internal gear 32 is configured by providing a plurality of first internal teeth 32b on an inner peripheral portion of a first annular portion 32a provided on the first internal tooth member 46. The second internal gear 33 is provided on an inner peripheral portion of a second internal tooth member 47 as a part of the second internal tooth member 47. The second internal tooth member 47 is integrally formed of the same material as the second internal gear 33. The second internal gear 33 is configured by providing a plurality of second internal teeth 33b on an inner peripheral portion of a second annular portion 33a provided on the second internal tooth member 47.

The operation relating to the above speed reducer 20 will be described. In the case of the bending meshing type speed reducer 20, when the gear drive unit 28a of the input shaft 28 serving as the wave generator rotates, the external gear 30 (flexible gear) is flexibly deformed so as to form an elliptical shape that matches the shape of the gear drive unit 28a. When the external gear 30 is flexibly deformed in this way, a meshing position between the external gear 30 and the internal gears 32 and 33 changes in a rotation direction of the input shaft 28. In the present example, the number of teeth (for example, 102) of the first internal gear 32 is 2×n (n is a positive integer) more than the number of teeth (for example, 100) of the external gear 30, and the number of teeth of the second internal gear 33 is the same as the number of teeth of the external gear 30. Thus, each time the input shaft 28 makes one rotation, the external gear 30 rotates by a difference in the number of teeth between the first internal gear 32 and the external gear 30, and an axial rotation component thereof is output from the second internal gear 33 serving as the drive-side internal gear to the second robot member 16 serving as the driven member. In this case, the output rotation decelerated at a reduction ratio according to the number of teeth of the external gear 30 and the internal gears 32 and 33 is output with respect to the input rotation of the input shaft 28.

Figure 2:
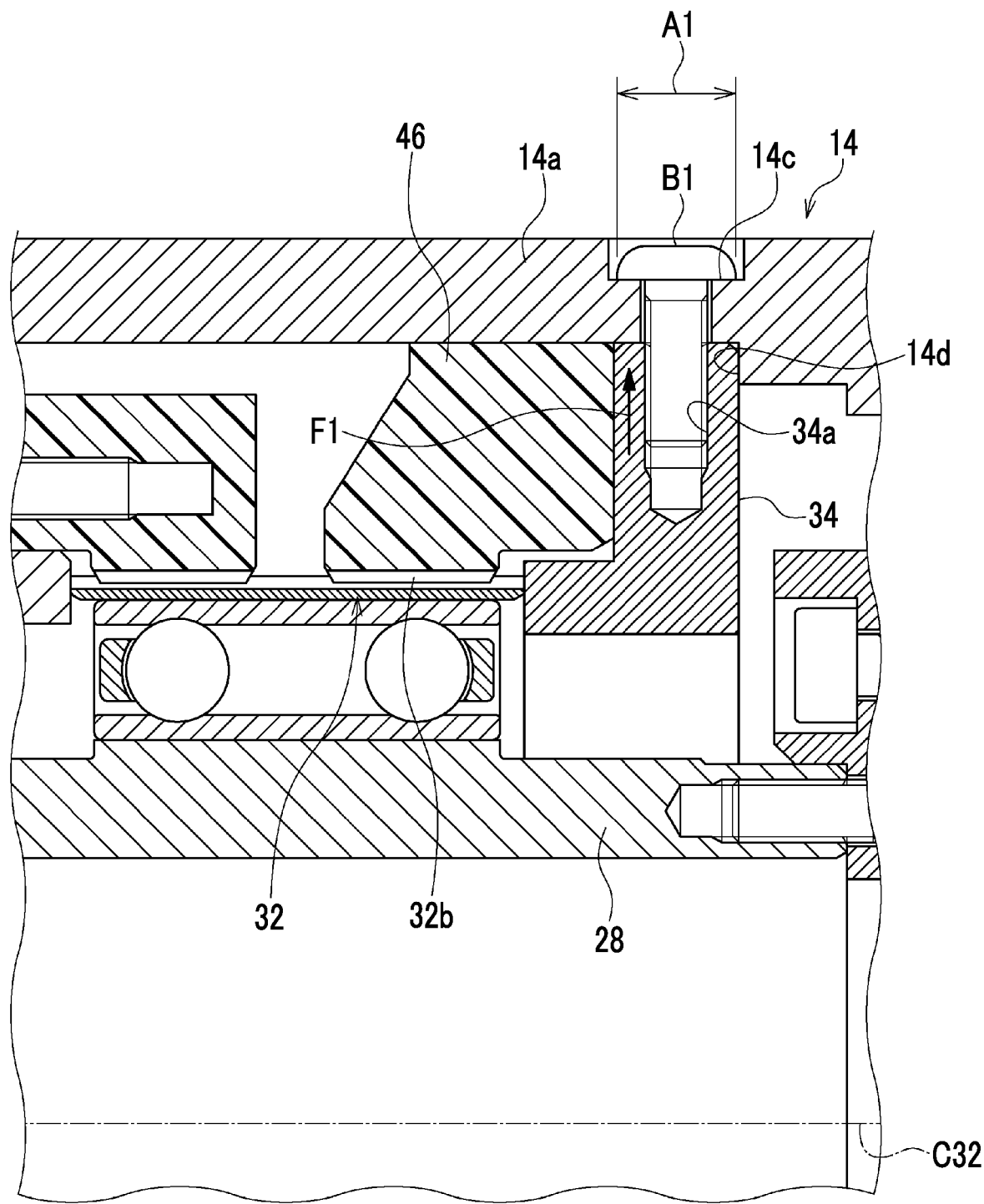
FIG. 2 is a side sectional view showing a part of the joint structure of the one embodiment.

FIG. 2 will be referred to. The description of the fixing member 34 and the like will be made. The fixing member 34 is disposed on the input side with respect to the first internal gear 32 (first internal tooth member 46). The fixing member 34 of the present embodiment is a member separate from the first internal gear 32 (first internal tooth member 46). The fixing member 34 has a continuous disk shape around the center C32 of the first internal gear 32, and the input shaft 28 penetrates the inside thereof.

The fixing member 34 is relatively non-rotatably fixed to the first robot member 14 by bringing an inner peripheral surface of the first robot member 14 and an outer peripheral surface of the fixing member 34 into pressure contact with each other in the radial direction by fastening using the first fastening member B1. The expression "fastening the fastening member herein means fastening a plurality of fastened members by applying a fastening force along a shaft portion of the first fastening member B1 to the plurality of fastened members. The first fastening member B1 of the present embodiment fastens the first robot member 14 and the fixing member 34 in the radial direction as the plurality of fastened members. The expression "fastening in the radial direction" herein means fastening a plurality of fastened members by applying a fastening force in the radial direction.

The fixing member 34 is made of the first internal tooth member 46, that is, a material having a Young's modulus [N/mm$^2$] larger than that of the first internal gear 32. In order to realize this, for example, the first internal tooth member 46 may be made of a resin-based material, and the fixing member 34 may be made of a metal-based material. The resin-based material refers to a material having resin as a main material. The resin-based material may be, for example, a material using only a resin such as a general-purpose engineering plastic or a special engineer plastic, or a composite material using a resin such as a carbon fiber reinforced resin or a glass fiber reinforced resin. The metal-based material refers to a material having metal as a main material. The metal-based material may be, for example, a material using only a metal such as an iron-based material, an aluminum-based material, or an alloy, or a composite material using a metal such as a fiber reinforced metal. In addition, the material of each member is not particularly limited. However, in the present embodiment, not only the first internal gear 46 but also the second internal gear 47 and the synchronization member 40 are made of the resin-based material, whereby weight saving is achieved. On the other hand, the bearing housing 38 is made of a material having a Young's modulus higher than that of the first internal gear 32, for example, the metal-based material.

Although the first fastening member B1 of the present embodiment is a bolt, a specific example thereof is not particularly limited and may be, for example, a rivet (for example, a blind rivet). The first robot member 14 includes a first counterbored hole 14c that is provided on an outer peripheral surface of the first robot member 14 to accommodate a head portion of the first fastening member B1. The first counterbored hole 14c is formed as a recessed portion that is recessed radially inward in the first casing 14a of the first robot member 14. The fixing member 34 includes a first female screw hole 34a for screwing the first fastening member B1 in the radial direction.

An axial range A1 of the first fastening member B1 is assumed. At least a part of the axial range A1 does not overlap the first internal teeth 32b of the first internal gear 32 when viewed in the radial direction. In the present embodiment, the entire axial range A1 does not overlap the first internal teeth 32b when viewed in the radial direction. In order to satisfy this condition, the first fastening member B1 of the present embodiment is disposed on the input side with respect to the first internal teeth 32b.

The first robot member 14 includes a first inner step portion 14d capable of positioning the fixing member 34 in the axial direction X by coming into contact with the fixing member 34 from the input side. The fixing member 34 is fixed to the first robot member 14 by screwing the first fastening member B1 in the radial direction in a state in which the fixing member 34 has come into contact with the first inner step portion 14d of the first robot member 14.

FIG. 1 will be referred to. The fixing member 34 of the present embodiment is provided so as to be non-rotatable relative to the first internal gear 32 (first internal tooth member 46) by the second fastening member B2. Although the second fastening member B2 of the present embodiment is a bolt, a specific example thereof is not particularly limited and may be, for example, a rivet (for example, a blind rivet or the like). The second fastening member B2 fastens the first internal gear 32 and the fixing member 34 in the axial direction X, thereby making the first internal gear 32 and the fixing member 34 non-rotatable relative to each other. The first internal tooth member 46 includes a second female screw hole 46a for screwing the second fastening member B2 in the axial direction. The first internal tooth member 46 has a first protrusion portion 46b that protrudes further to the input side than the first internal teeth 32b of the first internal gear 32. The second female screw hole 46a is formed in an axial range including the first protrusion portion 46b. The fixing member 34 includes a second counterbored hole 34b that accommodates a head portion of the second fastening member B2. The second counterbored hole 34b is provided at a position that overlaps the axial position of a pressure contact spot 60 of the fixing member 34 with respect to the first robot member 14 in the radial direction. The second counterbored hole 34b is formed as a recessed portion that is recessed from an input-side side surface of the fixing member 34 toward the counter-input side.

The fixing member 34 has a second protrusion portion 34c that is disposed radially inside the first protrusion portion 46b and protrudes to the counter-input side. The second protrusion portion 34c comes into contact with the external gear 30 from the input side and restricts the axial movement of the external gear 30. In order to realize this, the fixing member 34 of the present embodiment directly comes into contact with the external gear 30 but may come into contact with the external gear 30 via a spacer.

Figure 3:
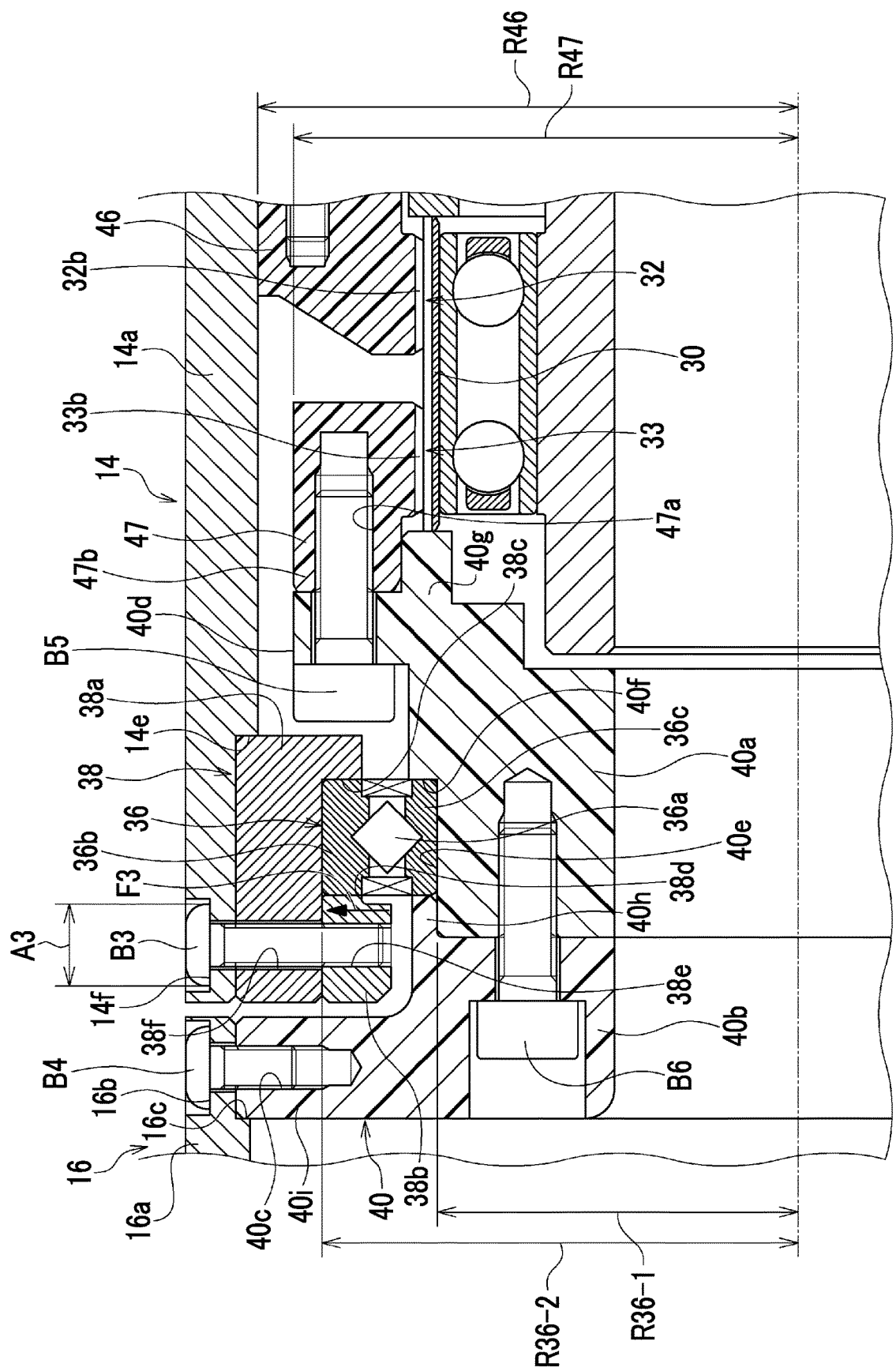
FIG. 3 is another side sectional view showing a part of the joint structure of the one embodiment.

FIG. 3 will be referred to. The main bearing 36 is disposed between the bearing housing 38 and the synchronization member 40. The bearing housing 38 is provided so as to be non-rotatable relative to the first robot member 14, and the synchronization member 40 is provided so as to be non-rotatable relative to the second robot member 16. In the main bearing 36 of the present embodiment, such bearing housing 38 and synchronization member 40 are relatively rotatably connected (supported) to each other, thereby relatively rotatably connecting (supporting) the first robot member 14 and the second robot member 16.

The main bearing 36 of the present embodiment is a cross roller bearing and includes a dedicated outer ring 36b and a dedicated inner ring 36c in addition to the rolling element 36a. A specific example of the main bearing 36 is not particularly limited and may be configured to include a plurality of bearings (angular ball bearing, taper bearing) disposed at intervals in the axial direction, in addition to another single bearing such as a ball bearing. The main bearing 36 does not include the dedicated outer ring 36b, and an inner peripheral surface of the bearing housing 38 may also serve as the main bearing 36. Additionally, the main bearing 36 does not include the dedicated inner ring 36c, and an outer peripheral surface of the synchronization member 40 may also serve as the inner ring 36c.

The main bearing 36 is disposed so as to deviate from the first internal tooth member 46 and the second internal tooth member 47 in the axial direction X. The main bearing 36 is disposed so as to deviate in the axial direction X from a certain axial range of the first internal tooth member 46 and the second internal tooth member 47. An inner diameter R36-1 of the main bearing 36 is smaller than outer diameters R46 and R47 of the internal tooth members 46 and 47. Here, the outer diameters R46 and R47 refer to the largest outer diameter of each of the first internal tooth member 46 and the second internal tooth member 47. Additionally, the "inner diameter" and the "outer diameter" in the present specification both refer to a radius. In a case where a plurality of internal tooth members 46 and 47 are present as in the present embodiment, this condition has only to be satisfied between any internal tooth members 46 and 47. The inner diameter R36-1 of the present embodiment is smaller than both of the outer diameters R46 and R47. The outer diameter R36-2 of the main bearing 36 is smaller than the outer diameters R46 and R47 of the internal tooth members 46 and 47. In a case where a plurality of internal tooth members 46 and 47 are present as in the present embodiment, this condition has only to be satisfied between any internal tooth members 46 and 47. The outer diameter R36-2 of the present embodiment is smaller than both of the outer diameters R46 and R47. In addition, in the present embodiment, the inner diameter R36-1 is smaller than the inner diameter of a tooth tip circle of each of the first internal tooth member 46 and the second internal tooth member 47. Additionally, the outer diameter R36-2 is larger than the inner diameter of the tooth tip circle of each of the first internal tooth member 46 and the second internal tooth member 47.

The bearing housing 38 is disposed radially outside the main bearing 36. The bearing housing 38 of the present embodiment is made of a member separate from the first robot member 14. The first robot member 14 of the present embodiment includes a second inner step portion 14e capable of positioning the bearing housing 38 in the axial direction by coming into contact with the bearing housing 38 from the input side.

The bearing housing 38 of the present embodiment is configured by combining a plurality of housing members 38a and 38b. The plurality of housing members 38a and 38b include a first housing member 38a disposed radially outside the main bearing 36 and a second housing member 38b disposed radially inside the first housing member 38a. The first housing member 38a is provided with a first movement restricting part 38c that restricts the axial movement of the main bearing 36 to the input side by coming into contact with the main bearing 36 from the input side. The first movement restricting part 38c of the present embodiment is configured by an inner step portion provided on the first housing member 38a but may be configured by a retaining ring or the like provided on the first housing member 38a. The second housing member 38b is provided with a second movement restricting part 38d that restricts the axial movement of the main bearing 36 to the counter-input side by coming into contact with the main bearing 36 from the counter-input side. The second movement restricting part 38d of the present embodiment is configured by an inner step portion provided on the second housing member 38b but may be configured by a retaining ring or the like provided on the second housing member 38b. The main bearing 36 is positioned in the axial direction with respect to the bearing housing 38 by coming into contact with the first movement restricting part 38c and the second movement restricting part 38d of the bearing housing 38.

The bearing housing 38 is radially fastened to the first robot member 14 by the third fastening member B3. The bearing housing 38 is fixed to the first robot member 14 by bringing the inner peripheral surface of the first robot member 14 and the outer peripheral surface of the bearing housing 38 into pressure contact with each other by fastening using the third fastening member B3. Although the third fastening member B3 of the present embodiment is a bolt, a specific example thereof is not particularly limited and may be, for example, a rivet (for example, a blind rivet or the like). The first robot member 14 includes a third counter-bored hole 14f that is provided on the outer peripheral surface of the first robot member 14 to accommodate a head portion of the third fastening member B3. The third counterbored hole 14f is formed as a recessed portion that is recessed radially inward in the first casing 14a of the first robot member 14. The bearing housing 38 includes a third female screw hole 38e for screwing the third fastening member B3 in the radial direction. The third female screw hole 38e is formed in the second housing member 38b of the bearing housing 38. An insertion hole 38f having no thread for allowing a shaft portion of the third fastening member B3 to pass therethrough in the radial direction is formed in the first housing member 38a of the bearing housing 38.

An axial range A3 of the third fastening member B3 is assumed. At least a part of the axial range A3 does not overlap each of the first internal teeth 32b of the first internal gear 32 and the second internal teeth 33b of the second internal gear 33 when viewed in the radial direction. In the present embodiment, the entire axial range A3 satisfies this condition. In order to satisfy this condition, the third fastening member B3 of the present embodiment is disposed on the counter-input side with respect to the second internal teeth 33b of the second internal gear 33. Both the entire axial range A1 of the first fastening member B1 and the entire axial range A3 of the third fastening member B3 do not overlap the first internal teeth 32b of the first internal gear 32 and the second internal teeth 33b of the second internal gear 33 when viewed in the radial direction.

The synchronization member 40 is disposed on one side (here, the counter-input side) in the axial direction with respect to the external gear 30. The synchronization member 40 of the present embodiment includes a first synchronization component 40a disposed on the external gear 30 side in the axial direction X, and a second synchronization component 40b provided on a side opposite to the external gear 30 in the axial direction with respect to the first synchronization component 40a.

The synchronization member 40 is radially fastened to the second robot member 16 by a fourth fastening member B4 such as a bolt. A flange portion 40i (described below) of the second synchronization component 40b of the synchronization member 40 is provided with a fourth female screw hole 40c for screwing the fourth fastening member B4 in the radial direction. The third casing 16a of the second robot member 16 includes a fourth counterbored hole 16b that accommodates a head portion of the fourth fastening member B4. The fourth counterbored hole 16b is formed as a recessed portion that is recessed radially inward in the third casing 16a of the second robot member 16.

The first synchronization component 40a includes a first outer diameter portion 40d that is fastened to a second internal tooth member 47 in the axial direction X by a fifth fastening member B5 such as a bolt, and a second outer diameter portion 40e having an outer diameter smaller than that of the first outer diameter portion 40d. The main bearing 36 is disposed in the second outer diameter portion 40e. The second outer diameter portion 40e is provided with a stepped shoulder portion 40f that restricts the axial movement of the main bearing 36 by coming into contact with the main bearing 36 from the axial input side. The second internal tooth member 47 includes a fifth female screw hole 47a for screwing the fifth fastening member B5 in the axial direction. The second internal tooth member 47 has a third protrusion portion 47b that protrudes further to the counter-input side than the second internal teeth 33b of the second internal tooth member 47. The fifth female screw hole 47a is formed in an axial range including the third protrusion portion 47b.

The first synchronization component 40a has a fourth protrusion portion 40g that is disposed radially inside the third protrusion portion 47b and protrudes to the input side. The second internal tooth member 47 and the first synchronization component 40a are relatively non-rotatably provided by being fastened to each other in the axial direction X by the fifth fastening member B5 in a state in which the third protrusion portion 47b and the fourth protrusion portion 40g are spigot-fitted to each other. The fourth protrusion portion 40g comes into contact with the external gear 30 from the counter-input side and restricts the axial movement of the external gear 30. In order to realize this, the fourth protrusion portion 40g of the present embodiment directly comes into contact with the external gear 30 but may come into contact with the external gear 30 via a spacer.

The second synchronization component 40b is fastened to the first synchronization component 40a in the axial direction X by screwing a sixth fastening member B6 such as a bolt in the axial direction. The second synchronization component 40b includes a movement restricting part 40h that is provided on an input-side side portion of the second synchronization component 40b and protrudes to the input side. The movement restricting part 40h of the second synchronization component 40b is spigot-fitted to a counter-input-side end portion of the first synchronization component 40a. The movement restricting part 40h of the second synchronization component 40b restricts the axial movement of the main bearing 36 by coming into contact with the main bearing 36 from the counter-input side in the axial direction X. The second synchronization component 40b includes a flange portion 40i that is provided on a counter-input-side portion of the second synchronization component 40b and overhangs radially outward. The flange portion 40i of the second synchronization component 40b is disposed inside the third casing 16a of the second robot member 16. A fitting portion 16c into which the flange portion 40i of the second synchronization component 40b is spigot-fitted is provided inside the third casing 16a.

In addition, a gear unit 62, which is a combination of the input shaft 28, the internal gears 32 and 33, the external gear 30, and the gear bearing 44 used in the joint structure 10 of the present embodiment, can be handled as a component independent of other elements used in the joint structure 10. A user of the gear unit 62 can obtain the joint structure 10 by combining the gear unit 62 provided by a provider (for example, a manufacturer or a seller) with another element prepared by the user himself/herself separately from the gear unit 62.

The effects of the above joint structure 10 will be described.

A radial load F1 caused by fastening using the first fastening member B1 acts on the speed reducer 20 in order to bring a part of the speed reducer 20 (here, the fixing member 34) and the first robot member 14 into pressure contact with each other in the radial direction. In the present embodiment, due to the fastening of the first fastening member B1, a tensile force directed radially outward acts on the fixing member 34 serving as each fastened member as the radial load F1 (refer to FIG. 2). When the fixing member 34 is deformed together with the first internal gear 32 including the first internal teeth 32b due to the radial load F1, the meshing between the first internal gear 32 and the external gear 30 may be adversely affected.

(A) Here, at least a part of the axial range A1 of the first fastening member B1 does not overlap the first internal teeth 32b of the first internal gear 32 when viewed in the radial direction. Thus, as compared to a case where the entire axial range A1 of the first fastening member B1 overlaps the first internal teeth 32b, it is possible to make it difficult for the radial load F1 caused by the fastening of the first fastening member B1 to act on the first internal gear 32. Consequently, the first internal gear 32 is less likely to be deformed by the radial load F1 caused by the first fastening member B1, and the adverse effect of the radial load F1 on the meshing between the first internal gear 32 and the external gear 30 can be suppressed.

(B) In particular, in the present embodiment, the entire axial range A1 of the first fastening member B1 does not overlap the first internal teeth 32b of the first internal gear 32 when viewed in the radial direction. Thus, it is possible to make it difficult for the radial load F1 caused by the first fastening member B1 to further act on the first internal gear 32.

A case where the first robot member 14 and the fixing member 34 are fastened to each other in the axial direction X by the first fastening member B1 will be considered. In this case, since a seating surface (bottom surface of the first counterbored hole 14c) on which the first fastening member B1 sits extends in the radial direction, the outer diameter of the first robot member 14 is likely to increase in size. In this regard, the first fastening member B1 of the present embodiment fastens the first robot member 14 and the fixing member 34 in the radial direction, thereby bringing the first robot member 14 and the fixing member 34 into pressure contact with each other. Thus, since it is not necessary to extend the seating surface for the first fastening member B1 in the first robot member 14 in the radial direction, the outer diameter of the first robot member 14 can be easily reduced around the first fastening member B1. In particular, it is effective in that the outer diameter of the first robot member 14 can be reduced while maintaining the inner diameter of the hollow portion 22a of the actuator 22.

(C) The fixing member 34 is a member separate from the first internal gear 32. Thus, as compared to a case where the first internal gear 32 and the fixing member 34 are made of the same member, it is possible to make it difficult for the radial load F1 caused by the first fastening member B1 to act on the first internal gear 32.

(D) The fixing member 34 is made of a material having a Young's modulus higher than that of the first internal gear 32. Thus, as compared to a case where the fixing member 34 is adjusted to have the Young's modulus of the first internal gear 32, it is possible to make it difficult for the fixing member 34 to be deformed by the radial load F1, and it is possible to make it difficult for the radial load F1 thereof to act on the first internal gear 32.

The bearing housing 38 is radially fastened to the first robot member 14 by the third fastening member B3. Thus, as compared to a case where the bearing housing 38 and the first robot member 14 are fastened in the axial direction X, it is not necessary to extend the diameter of the seating surface (bottom surface of the third counterbored hole 14f) for the third fastening member B3 in the first robot member 14 in the radial direction. Consequently, the outer diameter of the first robot member 14 can be easily reduced around the third fastening member B3.

In fastening the bearing housing 38 and the first robot member 14 in the radial direction via the third fastening member B3, a radial load F3 acts on the bearing housing 38 due to the fastening of the third fastening member B3. In the present embodiment, due to the fastening of the third fastening member B3, a tensile force directed radially outward acts on the bearing housing 38 as the radial load F3 (refer to FIG. 3). Here, the axial range A3 of the third fastening member B3 does not overlap the second internal teeth 33b of the second internal gear 33 when viewed in the radial direction. Thus, as compared to a case where the axial range A3 of the third fastening member B3 overlaps the second internal teeth 33b, it is possible to make it difficult for the radial load F3 acting due to the fastening of the third fastening member B3 to act on the second internal gear 33. Consequently, the second internal gear 33 is less likely to be deformed by the radial load F3 caused by the third fastening member B3, and the adverse effect of the radial load F3 on the meshing between the second internal gear 33 and the external gear 30 can be suppressed.

In order to suppress such an adverse effect on the meshing between the second internal gear 33 and the external gear 30, it is more preferable to adopt a configuration described next. The axial range A3 of the third fastening member B3 does not overlap the second internal tooth member 47 when viewed in the radial direction. The third fastening member B3 of the present embodiment is disposed on the counter-input side with respect to the second internal tooth member 47. At least a part of the axial range A3 does not overlap the main bearing 36 when viewed from the radial direction and is disposed on the counter-input side with respect to the main bearing 36. The entire axial range A3 of the present embodiment is disposed on the counter-input side with respect to the main bearing 36.

The synchronization member 40 is radially fastened to the second robot member 16 by the fourth fastening member B4. Thus, in the second robot member 16, it is not necessary to extend the seating surface (bottom surface of the fourth counterbored hole 16b) for the fourth fastening member B4 in the radial direction. Consequently, the outer diameter of the second robot member 16 can be easily reduced around the fourth fastening member B4.

(E) The inner diameter R36-1 of the main bearing 36 is smaller than the outer diameters R46 and R47 of the internal tooth members 46 and 47. Thus, compared to a case where the inner diameter R36-1 of the main bearing 36 has a size equal to or larger than the outer diameters R46 and R47 of the internal tooth members 46 and 47, the outer diameter of the first robot member 14 can be easily reduced.

Second Embodiment

Figure 4:
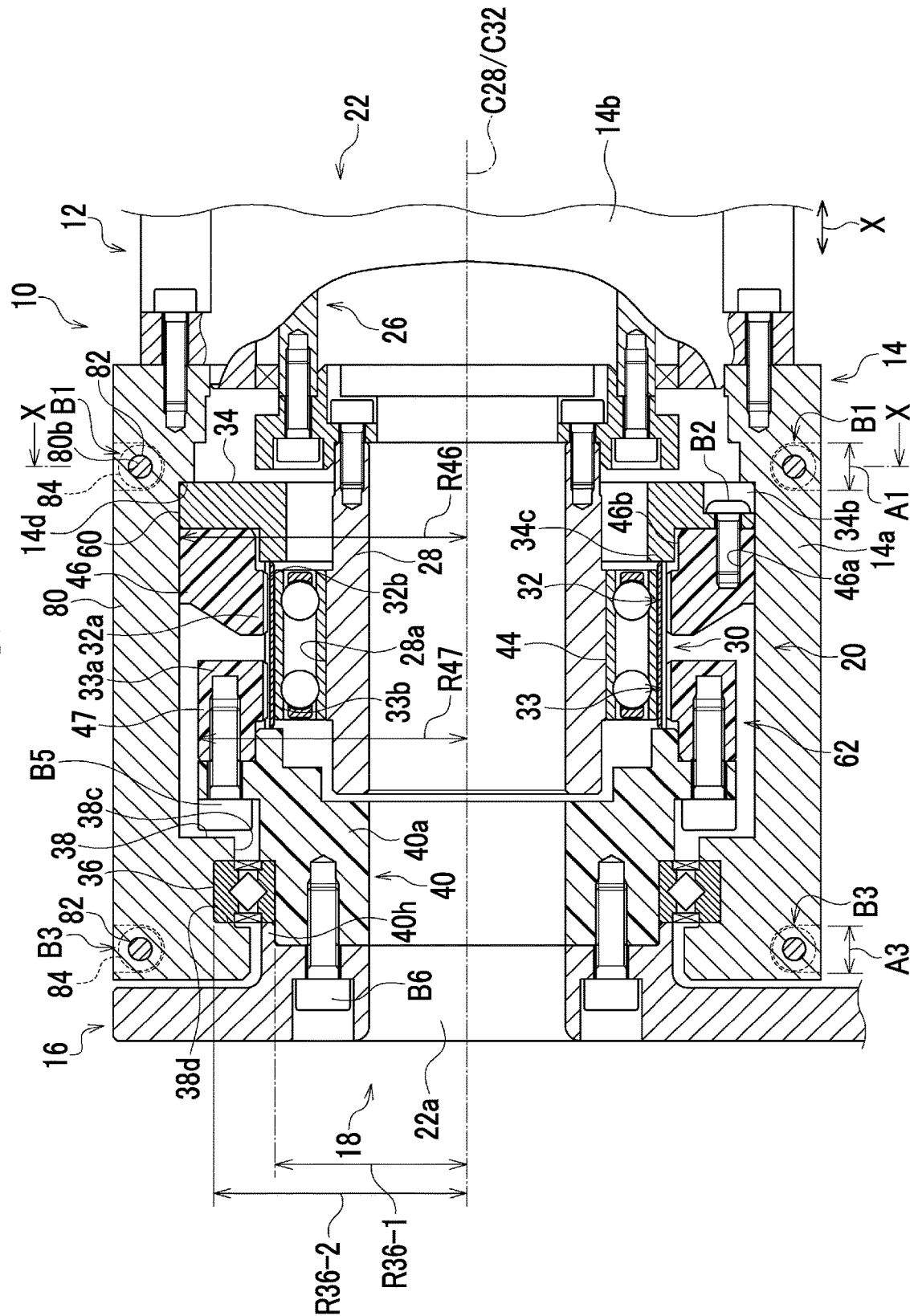
FIG. 4 is a side sectional view showing a joint structure of another embodiment.
Figure 5:
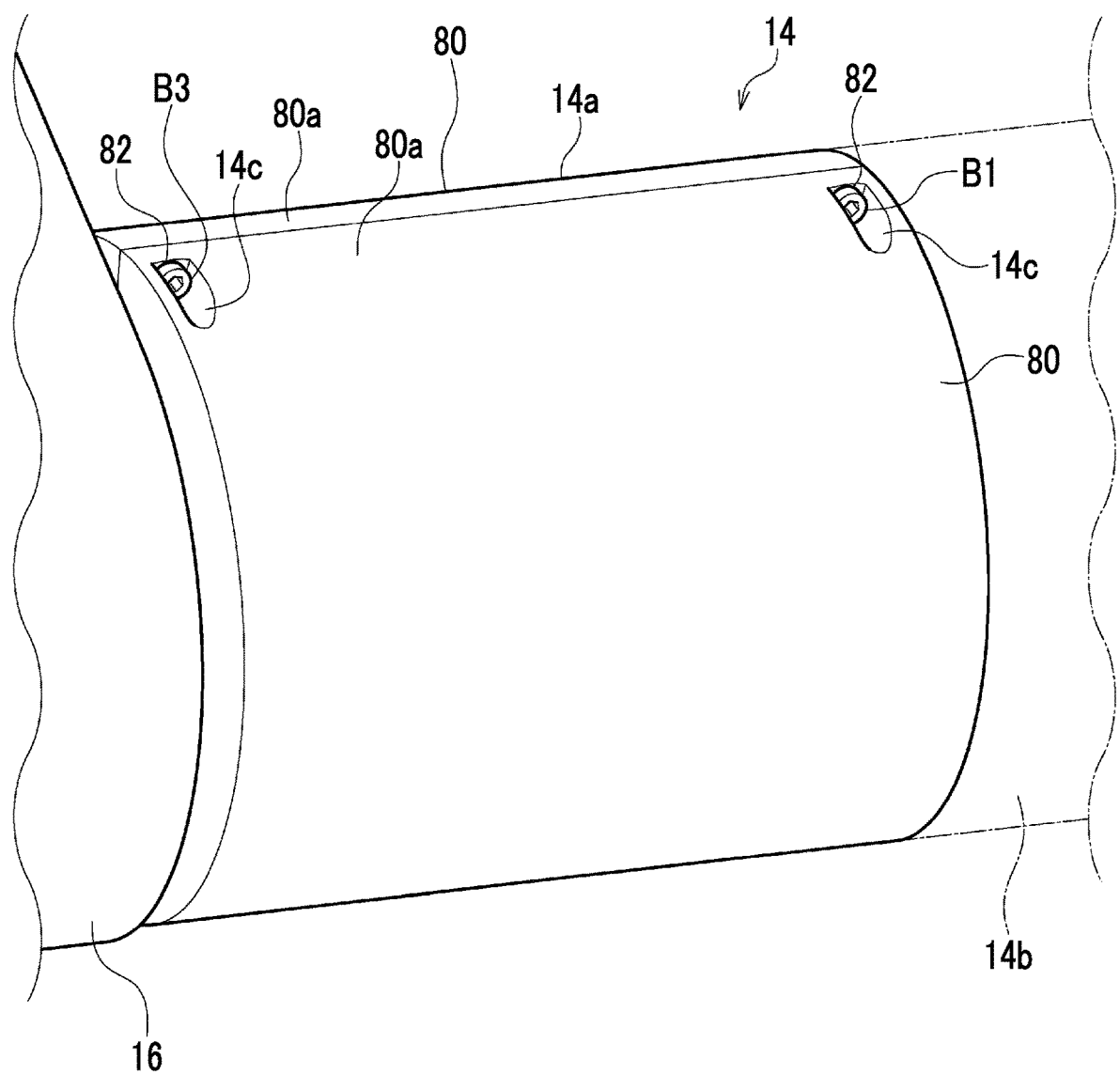
FIG. 5 is a perspective view showing the joint structure of another embodiment.
Figure 6:
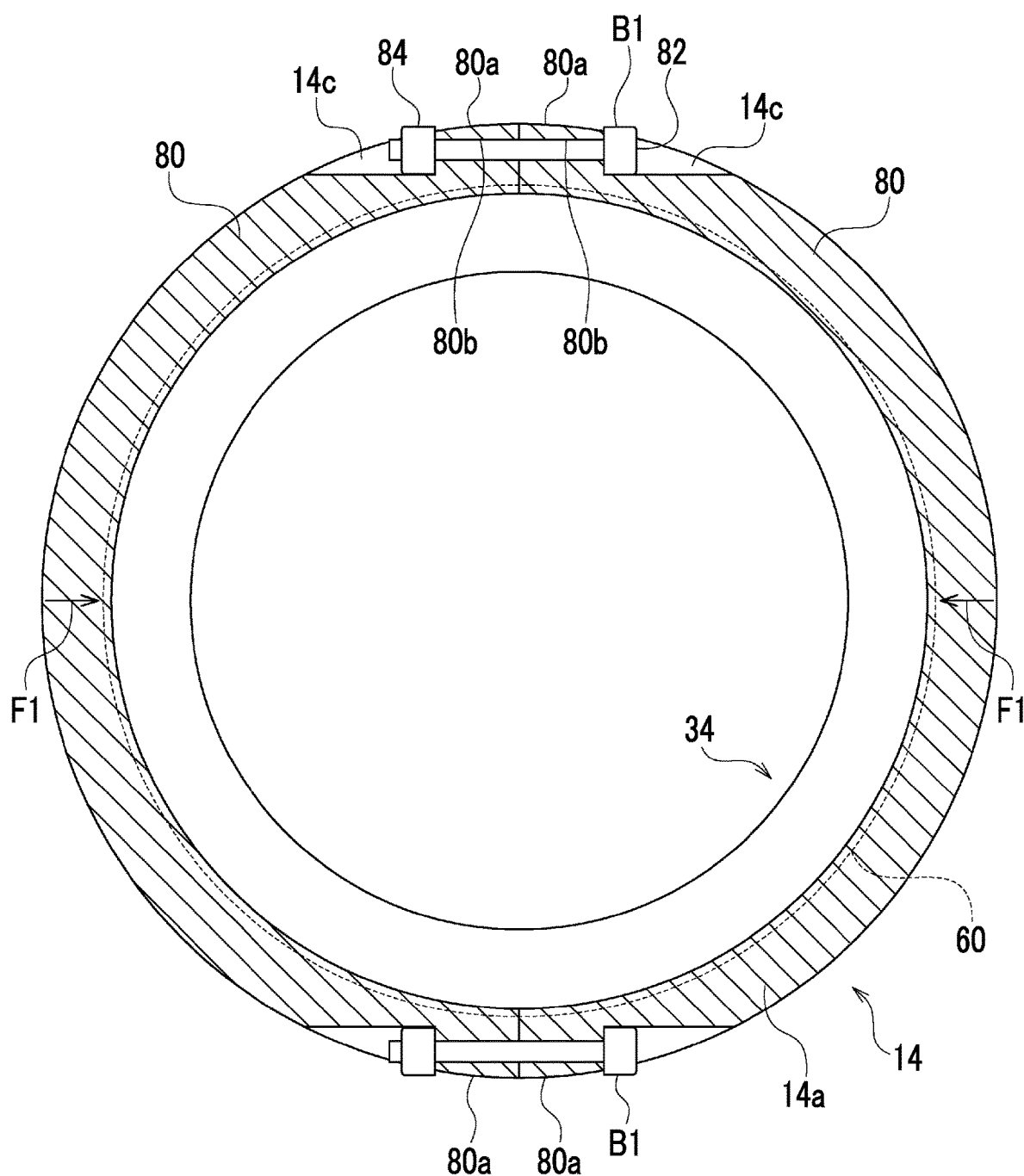
FIG. 6 is a schematic sectional view showing a part of an X-X cross section of FIG. 4.

FIGS. 4, 5, and 6 will be referred to. A joint structure 10 of the other embodiment is different from the joint structure 10 of the one embodiment mainly in terms of the first robot member 14, the second robot member 16, the bearing housing 38, and the synchronization member 40.

The bearing housing 38 of the present embodiment also serves as a part of the first robot member 14 (here, the first casing 14a) and is integrally made of the same member as a part of the first robot member 14. The bearing housing 38 of the present embodiment also includes the same first movement restricting part 38c and second movement restricting part 38d as those of the one embodiment and positions the main bearing 36 in the axial direction X.

The synchronization member 40 of the present embodiment includes only the first synchronization component 40a out of the first synchronization component 40a and the second synchronization component 40b and does not include the second synchronization component 40b. The second robot member 16 is fastened to the synchronization member 40 by the sixth fastening member B6 and includes the same movement restricting part 40h as the second synchronization component 40b.

The first robot member 14 includes a plurality of (two in the present embodiment) divided portions 80 obtained by dividing a part (here, the first casing 14a) of the first robot member 14 in the circumferential direction. As a whole, the plurality of divided portions 80 form a tubular cross section in a cross section perpendicular to the axial direction X. The adjacent divided portions 80 are provided at circumferential end portions of the individual divided portions 80 and include butted end portions 80a that are butted against each other. The plurality of divided portions 80 are fastened in the circumferential direction (tangential direction) by the first fastening member B1 disposed on the input side and the third fastening member B3 disposed on the counter-input side.

The first fastening member B1 of the present embodiment fastens the plurality of divided portions 80 as the plurality of fastened members in the circumferential direction, thereby bringing a part (here, the first casing 14a) of the first robot member 14 configured by the plurality of divided portions 80 into pressure contact with the fixing member 34. The expression "fastening in the circumferential direction" herein means fastening the plurality of divided portions 80 by applying a fastening force in the tangential direction on the outer peripheral surface of the first robot member 14. The fixing member 34 is fixed to the first robot member 14 by the friction applied to the pressure contact spot 60 with the first robot member 14 due to the fastening force of the first fastening member B1. The first fastening member B1 is individually used for each of the butted end portions 80a on both sides of the divided portion 80 in the circumferential direction and fastens the butted end portions 80a of the adjacent divided portions 80.

At least a part of the axial range A1 of the first fastening member B1 is disposed at a position not overlapping the fixing member 34 when viewed in the radial direction. In order to satisfy this condition, at least a part of the first fastening member B1 is disposed on aside (input side) opposite to the first internal gear 32 in the axial direction X with respect to the fixing member 34. At least a part of the axial range A1 of the first fastening member B1 of the present embodiment is disposed on the input side with respect to the first inner step portion 14d of the first robot member 14.

The third fastening member B3 of the present embodiment fastens the plurality of divided portions 80 in the circumferential direction, thereby bringing a part (here, the first casing 14a) of the first robot member 14 serving as the bearing housing 38 and constituted by the plurality of divided portions 80 into pressure contact with the main bearing 36. Similarly to the first fastening member B1, the third fastening member B3 is also individually used for each of the butted end portions 80a on both sides of the divided portion 80 in the circumferential direction and fastens the butted end portions 80a of the adjacent divided portions 80.

The axial range A3 of the third fastening member B3 is assumed. The axial range A3 of the third fastening member B3 has the same features as those of the axial range A3 of the third fastening member B3 of the one embodiment. For example, at least a part of the axial range A3 of the third fastening member B3 does not overlap each of the first internal teeth 32b of the first internal gear 32 and the second internal teeth 33b of the second internal gear 33 when viewed in the radial direction.

The first fastening member B1 and the third fastening member B3 of the present embodiment include a bolt 82 and a nut 84. The bolt 82 is inserted through insertion holes 80b provided in the butted end portions 80a of the adjacent divided portions 80. The outer peripheral surface of the first robot member 14 includes the first counterbored hole 14c that accommodates each of a head portion of the bolt 82 and the nut 84.

The effects of the above joint structure 10 will be described.

In the present embodiment, due to the fastening of the first fastening member B1, a load directed radially inward from each divided portion 80 serving as the fastened member to the fixing member 34 acts as the radial load F1 (refer to FIG. 6). As mentioned above, at least a part of the axial range A1 of the first fastening member B1 does not overlap the first internal teeth 32b of the first internal gear 32 when viewed in the radial direction. Thus, as mentioned above, it is possible to make it difficult for the radial load F1 caused by the first fastening member B1 to act on the first internal gear 32. Consequently, even in a case where the plurality of divided portions 80 are fastened in the circumferential direction, an adverse effect on the meshing between the first internal gear 32 and the external gear 30 caused by the radial load can be suppressed similarly to the above-mentioned (A).

Additionally, due to the fastening of the third fastening member B3, a load directed radially inward from the divided portion 80 to the main bearing 36 acts as a radial load (not shown). Here, the axial range A3 of the third fastening member B3 does not overlap the second internal teeth 33b of the second internal gear 33 when viewed in the radial direction. Thus, as compared to a case where the axial range A3 of the third fastening member B3 overlaps the second internal teeth 33b, it is possible to make it difficult for a radial load acting due to the fastening of the third fastening member B3 to acts on the second internal gear 33.

In addition to this, the joint structure 10 of the present embodiment includes the components (not shown) described in the above-mentioned (B) to (E), and the effects corresponding to the description can be obtained.

Next, modifications of the respective components described so far will be described.

Although an example has been described in which the speed reducer 20 is a bending meshing type speed reducer, the type of the speed reducer 20 is not limited thereto. For example, the speed reducer 20 may be an eccentric oscillation type speed reducer that uses a crankshaft as an input shaft. In this case, a center crank type in which a crankshaft is disposed on the center of an internal gear may be adopted, or a sorting type in which a plurality of crankshafts are disposed at positions offset from the center of the internal gear may be adopted. In this case, the number of internal gears may be one. Additionally, in the case of the bending meshing type speed reducer, a tubular type including the two internal gears 32 and 33 has been described as a specific example thereof, but the type thereof is not limited thereto. For example, a cup type or a silk hat type including one internal gear may be adopted. Additionally, the type of the speed reducer 20 may be a simple planetary gear device.

In the embodiments, an example has been described in which the first robot member 14 serves as a support member and the second robot member 16 serves as a driven member. In addition to this, the first robot member 14 may be a driven member, and the second robot member 16 may be a support member. In this case, when the tubular bending meshing type speed reducer is used, the first internal gear 32 may be a drive-side internal gear that drives the first robot member 14 serving as a driven member, and the second internal gear 33 may be a stationary-side internal gear fixed to the second robot member 16 serving as a support member.

In the case of the eccentric oscillation type speed reducer, the gear drive unit 28a of the input shaft 28 may be an eccentric body driven by oscillating the external gear 30. In this case, the synchronization member 40 may be a carrier that is disposed on one side in the axial direction with respect to the external gear 30 and is synchronizable with the axial rotation component of the external gear 30 by a pin that penetrates the external gear 30.

The fixing member 34 has only to be fixed to the first robot member 14 by bringing the first robot member 14 and the fixing member 34 into pressure contact with each other in the radial direction by fastening using the first fastening member B1, and a specific structure therefore is not limited to the contents of the embodiments. The fixing member 34 may be integrally made of the same member as that of the internal gear 32. The Young's modulus of the fixing member 34 may be equal to or lower than the Young's modulus of the internal gear 32.

At least a part of the axial range A1 of the first fastening member B1 has only not to overlap the internal teeth 32b of the internal gear 32 when viewed in the radial direction, and a part thereof may not overlap the internal teeth 32b of the internal gear 32.

The means for relatively non-rotatably providing the internal gear 32 and the fixing member 34 is not limited to the second fastening member B2. In order to realize this, for example, fitting of a spline, a key, or the like may be used.

The means for relatively non-rotatably providing the bearing housing 38 and the first robot member 14 is not limited to the third fastening member B3. In order to realize this, for example, fitting of a spline, a key, or the like may be used. Additionally, the bearing housing 38 may be fastened to the first robot member 14 in the axial direction X by the third fastening member B3.

An example in which the bearing housing 38 is configured by combining a plurality of housing members 38a and 38b has been described. However, the bearing housing 38 may be configured by a single member. Also in this case, the bearing housing 38 may include the plurality of movement restricting parts 40h.

The third fastening member B3 may overlap any one of the first internal teeth 32b of the first internal gear 32 and the second internal teeth 33b of the second internal gear 33 when viewed in the radial direction.

In providing the synchronization member 40 so as to be non-rotatable relative to the second robot member 16, specific means thereof is not particularly limited. In order to realize this, for example, fitting of a spline, a key, or the like may be used.

The main bearing 36 may be disposed at a position that does not deviate from the internal tooth members 46 and 47 in the axial direction X, that is, at a position that overlaps the internal tooth members 46 and 47 when viewed from the radial direction. In this case, the inner diameter R36-1 of the main bearing 36 may have a size equal to or larger than the outer diameters R46 and R47 of the internal tooth members 46 and 47.

The above embodiment and modifications are exemplary. The technical ideas in which these are abstracted should not be interpreted as being limited to the contents of the embodiments and modifications. Many design changes such as changes, additions, and deletions of components are possible for the contents of the embodiments and modifications. In the above-mentioned embodiments, the contents that allow such design changes are emphasized with the notation "embodiment". However, the design changes are allowed even in the contents with no such notation. The hatching given to the cross sections of the drawings does not limit the material of a hatched object. Structures referred to in the embodiments and modifications naturally include those that can be regarded as the same when manufacturing errors are taken into consideration.

A component configured by a single member in an embodiment may be configured by a plurality of members. Similarly, a component configured by a plurality of members in an embodiment may be configured by a single member.

It should be understood that the invention is not limited to the above-described embodiment, but may be modified into various forms on the basis of the spirit of the invention. Additionally, the modifications are included in the scope of the invention.

What is claimed is:

1. A robot joint structure comprising:
   a first robot member;
   a second robot member; and
   a speed reducer incorporated in a joint portion that connects the first robot member and the second robot member to each other,
   wherein the speed reducer includes an external gear, an internal gear that meshes with the external gear, and a fixing member that is provided so as to be non-rotatable relative to the internal gear and is fixed to the first robot member,
   wherein the fixing member is fixed to the first robot member by bringing an inner peripheral surface of the first robot member and an outer peripheral surface of the fixing member into pressure contact with each other by fastening using a first fastening member,
   at least a part of an axial range of the first fastening member does not overlap with respect to internal teeth of the internal gear when viewed in a radial direction,
   wherein the first robot member includes a plurality of divided portions obtained by dividing a part of the first robot member in a circumferential direction, and
   the first fastening member fastens the plurality of divided portions in the circumferential direction, thereby bringing the first robot member and the fixing member into pressure contact with each other.

2. The robot joint structure according to claim 1,
   wherein an entire axial range of the first fastening member does not overlap with the internal teeth when viewed in the radial direction.

3. The robot joint structure according to claim 1, further comprising:
   a main bearing that relatively rotatably connects the first robot member and the second robot member to each other;
   wherein the main bearing is disposed so as to axially deviate from an internal tooth member integrally formed of the same material as the internal gear, and
   an inner diameter of the main bearing is smaller than an outer diameter of the internal tooth member.

4. A robot joint structure comprising:
   a first robot member;
   a second robot member; and
   a speed reducer incorporated in a joint portion that connects the first robot member and the second robot member to each other,
   wherein the speed reducer includes an external gear, an internal gear that meshes with the external gear, and a fixing member that is provided so as to be non-rotatable relative to the internal gear and is fixed to the first robot member,
   wherein the fixing member is fixed to the first robot member by bringing an inner peripheral surface of the first robot member and an outer peripheral surface of the fixing member into pressure contact with each other by fastening using a first fastening member,
   at least part of an axial range of the first fastening member does not overlap with respect to internal teeth of the internal gear when viewed in a radial direction,
   wherein the fixing member is a member separate from the internal gear.

5. The robot joint structure according to claim 4,
   wherein the fixing member is made of a material having a Young's modulus higher than that of the internal gear.

6. The robot joint structure according to claim 4,
   wherein the fixing member is fastened to the internal gear in an axial direction by a second fastening member.

7. The bot joint structure according to claim 4,
   wherein the first fastening member fastens the first robot member and the fixing member in the radial direction, thereby bringing the first robot member and the fixing member into pressure contact with each other.

8. A robot joint structure comprising:
   a first robot member;
   a second robot member; and
   a speed reducer incorporated in a joint portion that connects the first robot member and the second robot member to each other,
   wherein the speed reducer includes an external gear, an internal gear that meshes with the external gear, and a fixing member that is provided so as to be non-rotatable relative to the internal gear and is fixed to the first robot member,
   wherein the fixing member is fixed to the first robot member by bringing an inner peripheral surface of the first robot member and an outer peripheral surface of the fixing member into pressure contact with each other by fastening using first fastening member,
   at least a part of an axial range of the first fastening member does not overlap with respect to internal teeth of the internal gear when viewed in a radial direction,
   the robot joint structure further comprising:
   a main bearing that relatively rotatably connects the first robot member and the second robot member to each other; and
   a bearing housing that is disposed radially outside the main bearing and accommodates the main bearing,
   wherein the bearing housing is fastened to the first robot member in the radial direction by a third fastening member.

9. The robot joint structure according to claim 8,
   wherein the speed reducer is a bending meshing type speed reducer including a first internal gear and a second internal gear,
   the first internal gear is relatively non-rotatably connected to the first robot member, and
   the second internal gear is relatively non-rotatably connected to the second robot member, and
   the third fastening member does not overlap with internal teeth of the second internal gear when viewed in the radial direction.

10. A robot joint structure comprising:
    a first robot member;
    a second robot member; and
    a speed reducer incorporated in a joint portion that connects the first robot member and the second robot member to each other, wherein the speed reducer includes an external gear, an internal gear that meshes with the external gear, and a fixing member that is provided so as to be non-rotatable relative to the internal gear and is fixed to the first robot member, wherein the fixing member is fixed to the first robot member by bringing an inner peripheral surface of the first robot member and an outer peripheral surface of the fixing member into pressure contact with each other by fastening using a first fastening member, at least a part of an axial range of the first fastening member does not overlap with respect to internal teeth of the internal gear when viewed in a radial direction, the robot joint structure further comprising:

a synchronization member that is provided so as to be non-rotatable relative to the second robot member and synchronized with an axial rotation component of the external gear, wherein the synchronization member is fastened to the second robot member in the radial direction by a fourth fastening member.

\* \* \* \* \*